US011018766B2

(12) United States Patent
Saathof

(10) Patent No.: US 11,018,766 B2
(45) Date of Patent: May 25, 2021

(54) OPTICAL SATELLITE COMMUNICATION

(71) Applicant: Nederlandse Organisatie voor toegepast-natuurwetenschappelijk onderzoek TNO, s-Gravenhage (NL)

(72) Inventor: Rudolf Saathof, Nieuwegein (NL)

(73) Assignee: Nederlandse Organisatie voor toegepast-natuurwetenschappelijk onderzoek TNO, 's Gravenhage (NL)

( * ) Notice: Subject to any disclaimer, the term of this patent is extended or adjusted under 35 U.S.C. 154(b) by 0 days.

(21) Appl. No.: 16/755,092

(22) PCT Filed: Oct. 11, 2018

(86) PCT No.: PCT/NL2018/050670
§ 371 (c)(1),
(2) Date: Apr. 9, 2020

(87) PCT Pub. No.: WO2019/074367
PCT Pub. Date: Apr. 18, 2019

(65) Prior Publication Data
US 2020/0244360 A1 Jul. 30, 2020

(30) Foreign Application Priority Data
Oct. 12, 2017 (EP) .................................... 17196210

(51) Int. Cl.
*H04B 10/118* (2013.01)
*H04B 10/40* (2013.01)
(Continued)

(52) U.S. Cl.
CPC ............ *H04B 10/118* (2013.01); *H04B 10/40* (2013.01); *H04B 10/43* (2013.01); *H04B 10/50* (2013.01); *H04B 10/60* (2013.01)

(58) Field of Classification Search
None
See application file for complete search history.

(56) References Cited

U.S. PATENT DOCUMENTS 4,227,077 A * 10/1980 Hopson ................. F41G 7/2213
244/3.16
7,826,752 B1 * 11/2010 Zanoni ................. H04B 10/614
398/205

(Continued)

OTHER PUBLICATIONS

Armstrong, et al. "Earth-to-deep-space optical communications system with adaptive tilt and scintillation correction by use of near-Earth relay mirrors," Optical Society of America, Optics Letters, vol. 23, No. 14, pp. 1087-1089, Jet Propulsion Laboratory, California Institute of Technology, Pasadena, California (Jul. 15, 1998).

(Continued)

*Primary Examiner* — Darren E Wolf
(74) *Attorney, Agent, or Firm* — Leydig, Voit & Mayer, Ltd.

(57) ABSTRACT

Information encoded in an uplink beam (Lu) is transmitted from transceiver (10) on earth (1) to a communication satellite (20) in orbit. The uplink beam (Lu) travels through an atmosphere (2) there between, wherein a wavefront (Wu) of the uplink beam (Lu) is distorted as a result of its propagation through the atmosphere (2). The transceiver (10) comprises a wavefront sensor (12) to measure a reference distortion (Wr') of a wavefront (Wr) of a reference beam (Lr). Adaptive optics (11) are used to pre-correct a wavefront (Wu) of the uplink beam (Lu) prior to its transmission based on the measured reference distortion (Wr'). The reference beam (Lr) originates from a guidestar satellite (30) formed by a separate man-made object at a distance (D) from the communication satellite (20) such that the reference beam (Lr) travels through the same part (2a) of the atmosphere (2) as the uplink beam (Lu).

16 Claims, 4 Drawing Sheets

(51) Int. Cl.
H04B 10/60 (2013.01)
H04B 10/43 (2013.01)
H04B 10/50 (2013.01)

(56) References Cited

U.S. PATENT DOCUMENTS

| | | | |
|---|---|---|---|
| 7,860,344 B1* | 12/2010 | Fitzpatrick ........... | G06K 9/3241 |
| | | | 382/291 |
| 2002/0196506 A1* | 12/2002 | Graves ............... | H04B 10/1125 |
| | | | 398/126 |
| 2006/0024061 A1* | 2/2006 | Wirth ................. | H04B 10/1125 |
| | | | 398/129 |
| 2014/0021329 A1* | 1/2014 | Spickermann ..... | G02B 26/0816 |
| | | | 250/201.1 |

OTHER PUBLICATIONS

Barbier, et al. "Performance improvement of a laser communication link incorporating adaptive optics," SPIE, vol. 3432, pp. 93-102, Laboratory for Physical Sciences and Electrical Engineering Department, University of Maryland, College Park—MD USA (Jul. 1998).
Marlow, et al. "Laser Guidestar Satellite for Ground-Based Adaptive Optics Imaging of Geosynchronous Satellites" Journal of Spacecraft & Rockets, 54(3), pp. 621-639 (2017).
European Patent Office, International Search Report in corresponding International Application No. PCT/NL2018/050670, dated Feb. 12, 2019 (2 pages).

* cited by examiner

OPTICAL SATELLITE COMMUNICATION

CROSS-REFERENCE TO RELATED APPLICATIONS

This patent application is a U.S. National Phase of PCT International Application No. PCT/2018/050670, filed Oct. 11, 2018, which claims priority to European Application No. 17196210.3, filed Oct. 12, 2017, which are both expressly incorporated by reference in their entireties, including any references contained therein.

TECHNICAL FIELD AND BACKGROUND

The present disclosure relates to optical communication between the ground and a satellite in orbit above the earth.

Optical laser communication can increase data rate from transceivers to satellites compared to radio waves. For example, an optical laser beam may carry higher frequencies for communication and can be focused to a specific target. However, atmospheric turbulence can distort the laser beam which may cause reduced detected laser power and even induce bit errors. In some instances, adaptive optics can be used to mitigate atmospheric turbulence. For example, an adaptive optics system can have a wavefront sensor which measures the distortion effects caused by atmospheric turbulence. In order to do so, typically a reference beam is needed which goes through the atmosphere. For example, the down-link laser beam, which is used for communication from the satellite to the transceiver, can be used as reference. However, because the earth and satellite are rotating, the beam from the satellite to the transceiver may traverse a different atmospheric path than the path from the transceiver to the satellite. Hence, wavefront pre-correction for the up-link optical path from the transceiver to the satellite may be sub-optimal.

As background information, Greenaway (Proc. SPIE 1494, Space Astronomical Telescopes and Instruments, 1 Sep. 1991) discusses a Satellite borne laser for adaptive optics reference. As further background, Greenaway (SPIE Vol. 2120 Laser Beam Propagation and Control; 1994) also discusses detection of sunlit particles of debris. However, no application for improving communication is envisaged, only imaging space and debris. Marlow et al. (Journal of Spacecraft and Rockets, Vol. 54, No. 3 (2017), pp. 621-639) describe a Laser Guidestar Satellite for Ground-based Adaptive Optics Imaging of Geosynchronous Satellites. However, resolving an image of the satellite does not improve communication, particularly uplink communication.

It is yet desired to improve optical communication with satellites, particularly with regards to reliability and data rate.

SUMMARY

Aspects of the present disclosure relate to methods, systems, and devices involved in optical communication between a ground based transceiver and communication satellite in orbit. Typically, in optical communication, information can be encoded in an uplink (laser) beam and transmitted from a transceiver to a communication satellite, or vice versa for a downlink beam. In the transmittal, the beam travels through an atmosphere there between, which may cause a distortion of its wavefront. The transceiver may comprise a wavefront sensor to measure e.g. a reference distortion of a reference beam also propagating through the atmosphere. The transceiver may comprise adaptive optics to pre-correct a wavefront of the uplink beam prior to its transmission based on the measured reference distortion. The pre-correction should preferably negate at least part of the measured wavefront distortion caused by travel through the atmosphere to improve, e.g. flatten, the wavefront of the uplink beam arriving at the communication satellite after propagating through the atmosphere.

Advantageously, as described herein, the reference beam can originate from a specifically constructed guidestar satellite which forms a separate (man-made) object at a distance from the communication satellite, preferably traveling in front of the satellite at least at the moment when the reference beam is sent. By the time, the uplink beam arrives back, the communication satellite may have moved considerable distance to the position formerly occupied by the guidestar satellite at the time the reference beam was sent. By using a separate guidestar satellite appearing in front of the communication satellite, the reference beam may travel through substantially the same part of the atmosphere as the uplink beam, or at least a part of the atmosphere that is more close-by to the uplink beam than if, e.g., the downlink beam of the communication satellite itself were used for wavefront correction. Because the reference beam and uplink beam may thus travel through substantially the same part of the atmosphere, the wavefront distortion measured in the reference beam may be better correlated to the wavefront distortion which will be experienced by the uplink beam. Hence the pre-correction can be better suited to remove distortion caused by the atmosphere. Preferably, by having the guidestar satellite travel in the same orbit, direction and velocity as the communication satellite, the distance there between may be fixed to allow improved continuous communication. Furthermore, by using a guidestar satellite with a mirror and/or other directional optics, the light originating from a celestial object such as the sun or moon can be redirected to serve as the reference beam. This may be more efficient and reliable than e.g. a space-based laser system.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1:
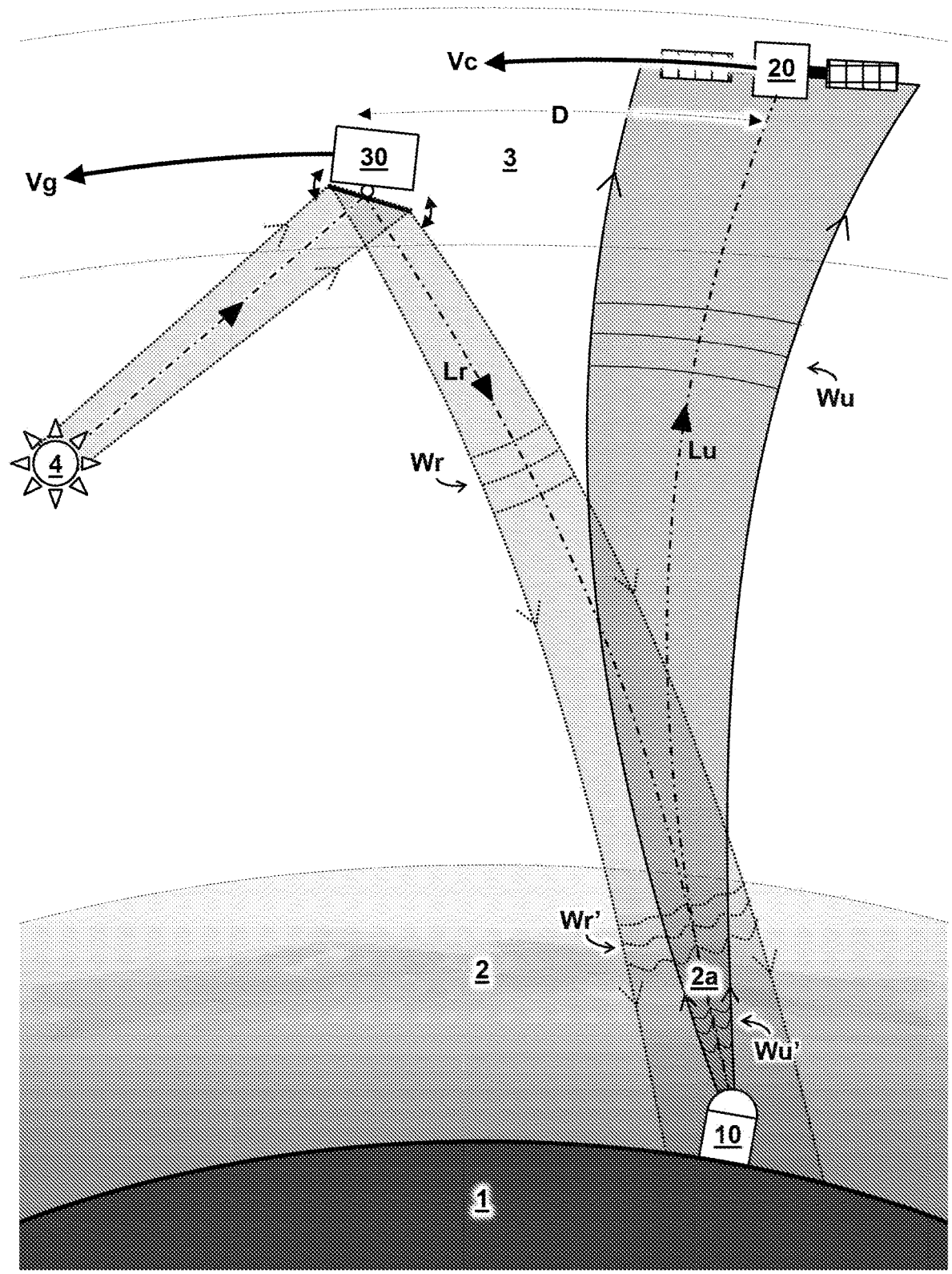
FIG. 1 schematically illustrates communication between a transceiver on the ground to a communication satellite in orbit using a reference beam from a guidestar satellite according to one embodiment.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 schematically illustrates optical communication between a transceiver 10 on earth 1 and a communication satellite 20 in an orbit 3 above the earth 1. In the figure, light beams Lr and Lu are depicted along curved trajectories as will be further explained later with reference to FIGS. 2A and 2B.

Some embodiments, as described herein, comprise transmitting information encoded in an uplink beam Lu from the transceiver 10 to the communication satellite 20. As shown, the uplink beam Lu travels through an atmosphere 2 there between. In some cases, a wavefront Wu of the uplink beam Lu can become distorted as a result of its propagation through the atmosphere 2, e.g. depending on turbulence, clouds, et cetera in a specific part 2a of the atmosphere 2 traversed by the beam Lu. In some embodiments, the transceiver 10 comprises a wavefront sensor (not shown here) to measure a reference distortion Wr' of a wavefront Wr of a reference beam Lr. The reference distortion Wr' can be caused by the reference beam Lr propagating through the atmosphere 2. In some embodiments, the transceiver 10 comprises adaptive optics (not shown here) to pre-correct a wavefront Wu of the uplink beam Lu prior to its transmission based on the measured reference distortion Wr'. Preferably, the pre-correction at least partially negates the measured wavefront distortion caused by travel through the atmosphere 2 to improve, e.g. flatten, the wavefront Wu of the uplink beam Lu arriving at the communication satellite 20 after propagating through the atmosphere 2.

In the embodiment shown, the reference beam Lr originates from a guidestar satellite 30. The guidestar satellite is formed by a separate (man-made) object which appears to send its reference beam Lr from a position that is at a distance D in front of the communication satellite 20 at least at the moment the reference beam Lr is sent. The term man-made is used here to indicate that the guidestar is purposely constructed for providing the reference beam as described herein, e.g. as opposed to random space debris or direct light from celestial bodies such as stars.

Preferably, but not necessarily, the distance D is fixed, e.g. wherein the guidestar satellite 30 precedes the communication satellite 20 in the same orbit. Accordingly, the reference beam Lr should travel through substantially the same part 2a of the atmosphere 2 as the uplink beam Lu, or at least a part of the atmosphere that is more close-by to the uplink beam Lu than if the downlink beam Ld of the communication satellite 20 itself were used. In this way, the distortions measured in the reference beam Lr can be better correlated to distortions which can be expected in the uplink beam Lu.

Preferably, the reference beam Lr is transmitted by the guidestar satellite 30 from an origin at a distance D in front of the communication satellite 20 with respect to a direction of an orbital velocity Vc of the communication satellite 20. In some embodiments, the distance D between the communication satellite 20 and the guidestar satellite 30 is approximately equal to (or a bit more than) a velocity Vc of the communication satellite 20 (in the direction of the distance) divided by a roundtrip time T that it takes the reference beam Lr to travel from the guidestar satellite 30 to the transceiver 10 and the corresponding uplink beam Lu to travel from the transceiver 10 back to the communication satellite 20. For example, this can be expressed as $D = f \cdot Vc/T$ where "f" is a factor equal to or more than one, e.g. "f" is between one and two, preferably less than one-and-half, more preferably, less than 1.1. Preferably the factor is on the one hand large enough to allow some processing time but as close as possible to unity so the atmospheric conditions do not significantly change.

In a preferred embodiment, the guidestar satellite 30 travels in the same orbit 3 as the communication satellite 20. Furthermore, preferably the guidestar satellite 30 travels with the same orbital velocity Vg as the velocity Vc of the communication satellite 20. Furthermore, preferably the guidestar satellite 30 travels in the same direction as the communication satellite 20. In the embodiment shown, the communication satellite 20 trails the guidestar satellite 30 in approximately the same orbit with a fixed distance D there between.

Alternatively to relying on a fixed distance D, e.g. wherein the communication satellite 20 and guidestar satellite 30 follow the same orbit, different orbits may be used. For example, the guidestar satellite 30 may send its reference beam Lr from the optimal position at a specific point in time to traverse the same part 2a of the atmosphere as the subsequent uplink beam Lu. The guidestar satellite 30 may even have a different altitude than the communication satellite 20 and the guidestar satellite 30 may travel in a different direction and/or with different speed. Also multiple guidestar satellites may be used, each sending a respective reference beam Lr for one or more communication satellites at specific times when their position in the sky corresponds to the position where the communication satellite will appear when receiving the respective uplink beam.

As described herein, the uplink beam Lu and/or reference beam Lr are optical beams. Preferably, at least the uplink beam Lu is a laser beam. Typically, the uplink beam Lu has a wavelength 1 between hundred nanometer and one millimeter, preferably between four hundred nanometer and twenty micrometer, e.g. 1550 nm. At least the atmosphere should be sufficiently transparent to the uplink beam. The reference beam Lr may have similar or different wavelengths, which may be determined by the light source. Preferably, the reference beam Lr is transmitted from the guidestar satellite 30 with a substantially flat wave front Wr, or at least a known initial wavefront to determine the distortion Wr' caused by the atmosphere 2.

In a preferred embodiment, the reference beam Lr originates from an extraterrestrial light source, more preferably from a celestial object 4 such as the sun or moon. For example, the reference beam Lr is a light beam originating from the sun reflected or otherwise redirected towards the transceiver 10. In some embodiments, the guidestar satellite 30 comprises a reflector or other light redirection means configured to redirect a beam of light as the reference beam Lr towards the transceiver 10. In some embodiments, the reference beam Lr may be a diffuse reflection. Also specular reflection may be used. For example, the guidestar satellite 30 comprises a surface to receive sunlight to be redirected as the reference beam Lr. Preferably, such surface has an area of more than ten square centimeter, preferably more than hundred square centimeter, e.g. 0.1 m$^2$ or more.

In a preferred embodiment, the guidestar satellite 30 comprises a pointing device or tracker to direct (or redirect) the reference beam Lr to the transceiver 10. In some embodiments, the guidestar satellite 30 comprises a sensor to receive a locator or acquisition beam from the transceiver 10 and control the pointing device to direct the reference beam Lr, e.g. towards the location where the locator beam originates from. For example, the locator beam may be relatively wide so that it is easier for the guidestar satellite 30 to lock onto. In some embodiments, the locator beam may be sufficiently wide that both the communication satellite 20 and guidestar satellite 30 may lock on to locate the transceiver 10 and adjust their downlink beams accordingly. Alternatively, or in addition to the use of a locator beam, the guidestar satellite 30 may comprise a controller keeping track of the relative position of the transceiver 10 for directing the reference beam Lr towards the transceiver 10. In some embodiments, the pointing device is configured to redirect the reference beam Lr from a light source such as the celestial object 4 towards the transceiver 10.

Alternative to reflecting light from a celestial object 4, the guidestar satellite 30 may reflect a reference laser beam originating from the earth (not shown). This can have an advantage that the light source can also be used when the guidestar satellite 30 resides in a shadow of the earth. However, a reference beam originating from the earth may also experience wavefront distortion from the uplink trip through the atmosphere, which may need correction and/or measurement by the guidestar satellite 30 prior to reflection to provide a known initial wavefront. Alternative to reflecting a light beam, the guidestar satellite 30 may comprise a laser or other light source (not shown), e.g. powered by a solar panel or other power source, optionally with a battery to store power. This also has the advantage that the light source can be used when the guidestar satellite 30 resides in a shadow of the earth 1 and may provide a desired wavefront without distortion.

In some embodiments, the guidestar satellite 30 comprises beam shaping or projecting optics (not shown) such as one or more lenses and/or curved mirrors to project the reference beam Lr at a localized region of the earth 1 around where the transceiver 10 is located, e.g. a region on earth with a diameter of less than ten kilometers, preferably less than one kilometer, more preferably less than two hundred meters, e.g. hundred meters. In some embodiments, beam shaping optics on board the guidestar satellite may expand the beam considerably, e.g. to provide a reference beam that services multiple transceivers, e.g. spanning area's on earth up to a thousand kilometers or more. In other or further embodiments (not shown), data may be sent up to a communication satellite from multiple transceivers at distant locations, each using a wide reference beam from one guidestar satellite for pre-correcting the respective wavefronts of the uplink beams.

In some embodiments (not shown), multiple different guidestar satellites can be used to provide references beams for pre-correction of the uplink wavefront Wu. For example, the communication satellite 20 may fly in formation preceded by two, three, or more separate guidestar satellites. The multiple different guidestars may also follow different trajectories than the communication satellite and/or each follows its own trajectory. One guidestar may also provide different communication satellites. In some embodiments, reference beams from multiple guidestar satellites are used to determine a wavefront distortion for one transceiver. For example, signals can be interpolated or otherwise combined. Also a wavefront distortion on a downlink beam (not shown here) from the communication satellite could be used in addition to one or more reference beams from one or more guidestar satellites.

In some embodiments (not shown), a reference beam from a sub-selection of, e.g. one or more, multiple guidestar satellites is used for pre-correction of the uplink wavefront. For example, the reference beam from a selected guidestar satellite is used corresponding to reference beam crossing the same or most similar part 2a of the atmosphere 2 where the uplink beam Lu is to be transmitted. In other or further embodiments, one or more guidestar satellites each comprise multiple distinct mirrors configured to reflect light in different directions. For example, a guidestar satellite 30 may comprise multiple mirrors to simultaneously provide reference beams for multiple transceivers at spaced apart locations on the ground. For example, a guidestar satellite 30 may comprise multiple mirrors to reflect at different times different beams towards the same transceiver 10, depending on the relative angles e.g. of the celestial object 4 and/or transceiver 10 which may change during orbit.

In a preferred embodiment, the communication satellite 20 is in geostationary orbit, that is a fixed point above the equator. This has an advantage that the position of the transceiver 10 with respect to the communication satellite 20 and guidestar satellite 30 appears stationary. Still, an optional mirror on the guidestar satellite 30 may need adjustment depending on the relative position of the celestial body 4. Alternative to geostationary orbit, the communication satellite 20 can also in geosynchronous orbit, or even low earth orbit.

Figure 2A:
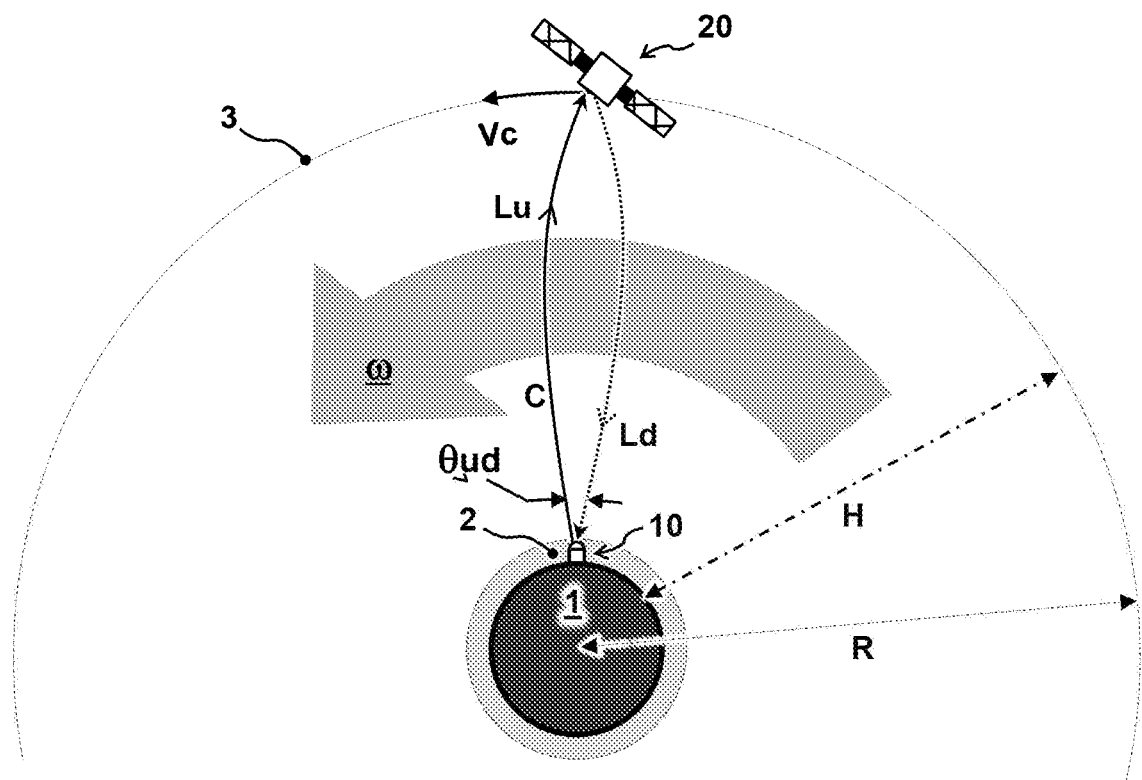
FIG. 2A schematically illustrates uplink and downlink light rays between a communication satellite and transceiver on earth as seen in a frame of reference rotating with the satellite.

FIG. 2A schematically illustrates uplink and downlink light rays, Lu and Ld between a communication satellite 20 and transceiver 10 on earth 1.

Without being bound by theory, light rays are schematically depicted here from the point of view of rotating frame. The origin of the rotating frame is chosen at the center of the earth 1 and the angular velocity (a is chosen such that the communication satellite 20, actually moving at velocity Vc, appears stationary. In the rotating frame, parts further away from the origin, move faster proportional to the radius R, that is $V = \omega \cdot R$. The outward traveling light beam Lu, which in actuality follows a straight line, appears to follow a curved trajectory in the rotating frame because the space around the origin is moved while the beam propagates at the (finite) speed of light C over a relatively large distance H (here: the altitude of the communication satellite). The inward traveling light beam Ld is also curved but in the other direction. The curvature of the light beams is highly exaggerated in the figures to demonstrate the effect where e.g. for a geostationary orbit the beams Ld and Lu typically only have a slightly different angle θud at the transceiver of a few arc seconds difference.

Figure 2B:
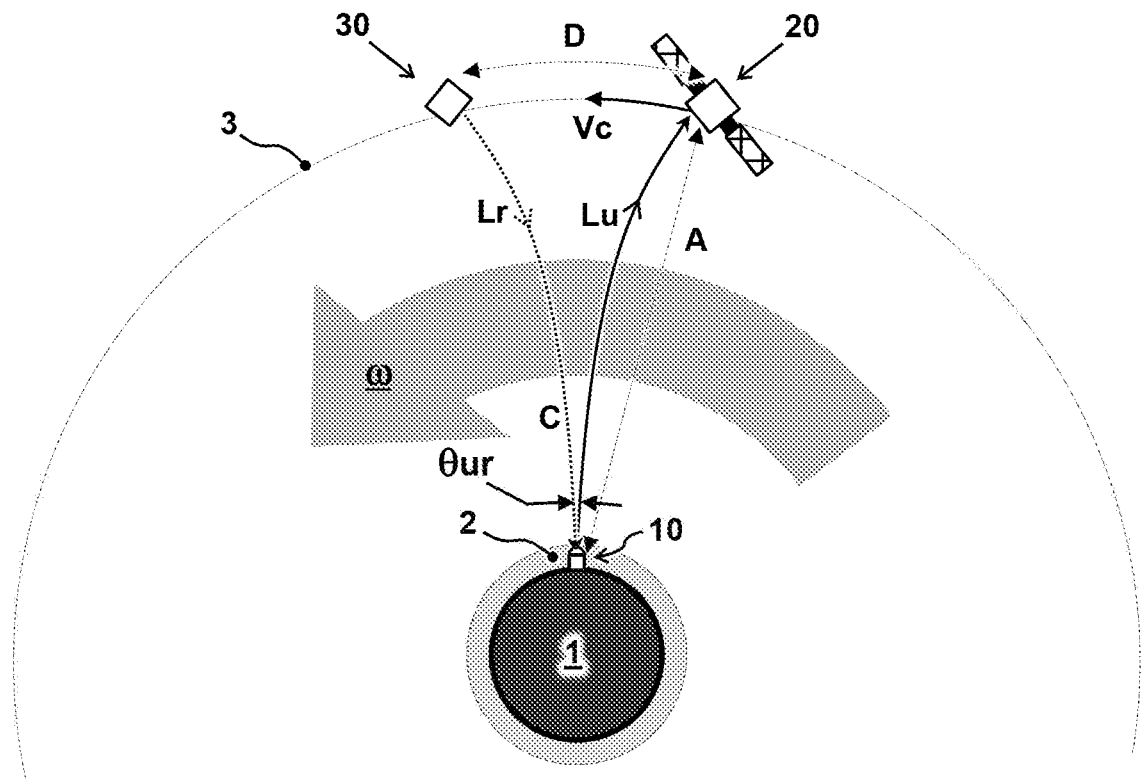
FIG. 2B schematically illustrates light rays in a rotating frame similar as FIG. 2A, but now depicting a reference beam originating from a guidestar satellite separate from the communication satellite.

FIG. 2B schematically illustrates light rays in a rotating frame similar as FIG. 2A, but now depicting a reference beam Lr originating from a guidestar satellite 30, instead of the downlink beam Ld originating from the communication satellite 20. The guidestar satellite 30 in this case is at a distance D in front of the communication satellite 20. It will be appreciated that the angle θur between the reference beam Lr and the uplink beam Lu at the transceiver 10 can be substantially smaller than the angle θud shown in FIG. 2A; the angle θur can even be substantially zero. The smaller angle means also that a more similar part of the atmosphere 2 may be traversed by the respective beams Lr and Lu.

In some embodiments, the communication satellite 20 may be in a geostationary orbit. A geostationary orbit can typically be achieved at an altitude very close to 35786 km (22236 mi) and directly above the equator. This equates to an orbital velocity of 3.07 km/s (1.91 mi/s) and an orbital period of 1,436 minutes, which equates to almost exactly one sidereal day (23.934461223 hours). The altitude H of a geostationary orbit is typically around 35786 km. To travel this altitude at the speed of light C (299792458 m/s) takes 0.11937 second. The orbital velocity Vc of a geostationary satellite is typically around 3.07 km/s. So in the time it takes light to travel from the transceiver 10 at the earth surface to a satellite 20 in geostationary orbit, the satellite may have moved about 366 meters. And for the round trip time of light traveling from a guidestar 30 to the ground and back to the satellite 20 takes at least twice this single journey, i.e. at least 0.2387 second, in which time the satellite has moved at least 732 meters. So the distance between a guidestar satellite 30 and communication satellite 20 in geostationary orbit may ideally be around six or seven hundred meters, or more. The distance between the satellites can be a little more, e.g. if the roundtrip time is longer. For example, the transceiver 10 may take some time to process between the reception of the reference beam Lr and the transmittal of the correspondingly corrected uplink beam Lu. Also if communication satellite 20 is not directly overhead of the transceiver, the distance A between the transceiver 10 and communication satellite 20 can be longer with a correspondingly longer roundtrip time and somewhat different ideal spacing between the communication satellite and the guidestar satellite.

In some aspects, the present disclosure may thus be embodied by a system comprising a communication satellite 20 in geostationary orbit and a guidestar satellite 30 formed by a separate object in the same orbit in front of a path of the communication satellite 20 wherein the communication satellite 20 and the guidestar satellite 30 are preferably separated by constant distance D in a range between 0.5-1.5 kilometers, preferably between 0.6-1.0 km, more preferably between 0.7-0.8 km, e.g. close to 732 meter. Of course other distances, constant or not, may be envisaged for other orbits of the communication satellite 20 and/or guidestar satellite 30.

Preferably, the guidestar satellite 30 thus travels the same trajectory as the communication satellite 20, so the distance D can be fixed. But also other trajectories and altitudes are possible. Indeed any position along the line of the reference beam Lr may in principle be a point of origin for the beam where the guidestar satellite 30 may be situated at the moment of sending the reference beam Lr to traverse the same part of the atmosphere as the corresponding uplink beam Lu.

Figure 3A:
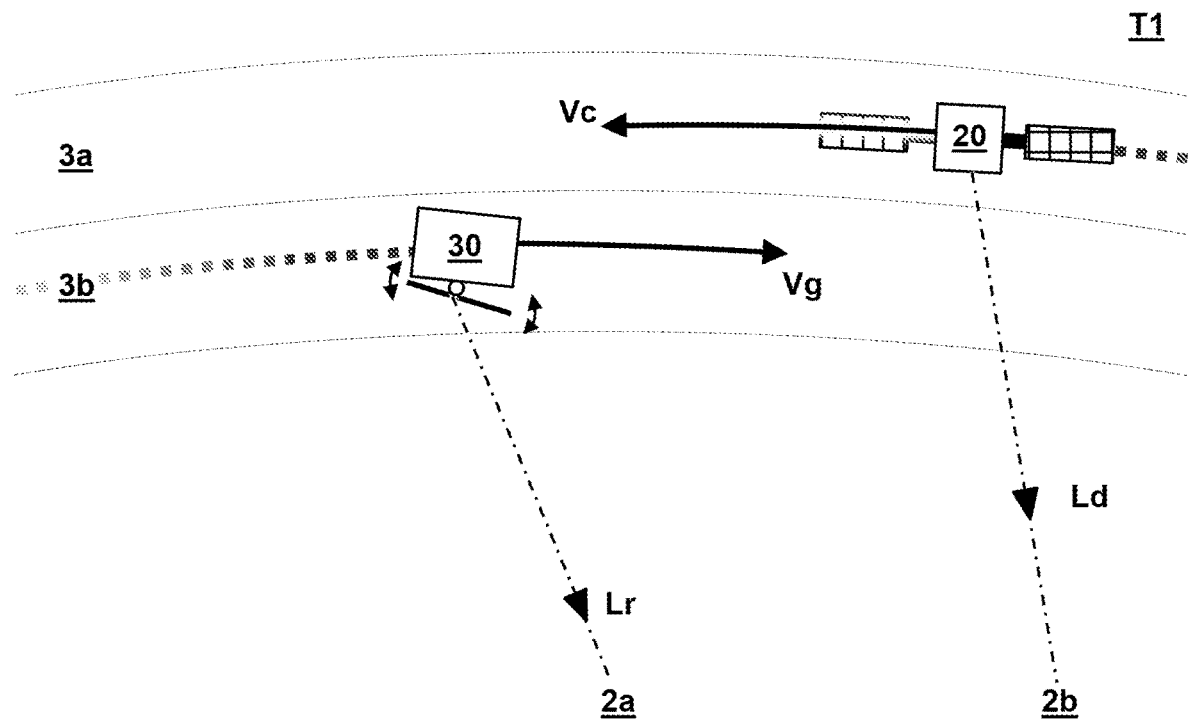
FIGS. 3A and 3B schematically illustrate an embodiment of two subsequent snapshots of a guidestar satellite and trailing communication satellite.
Figure 3B:
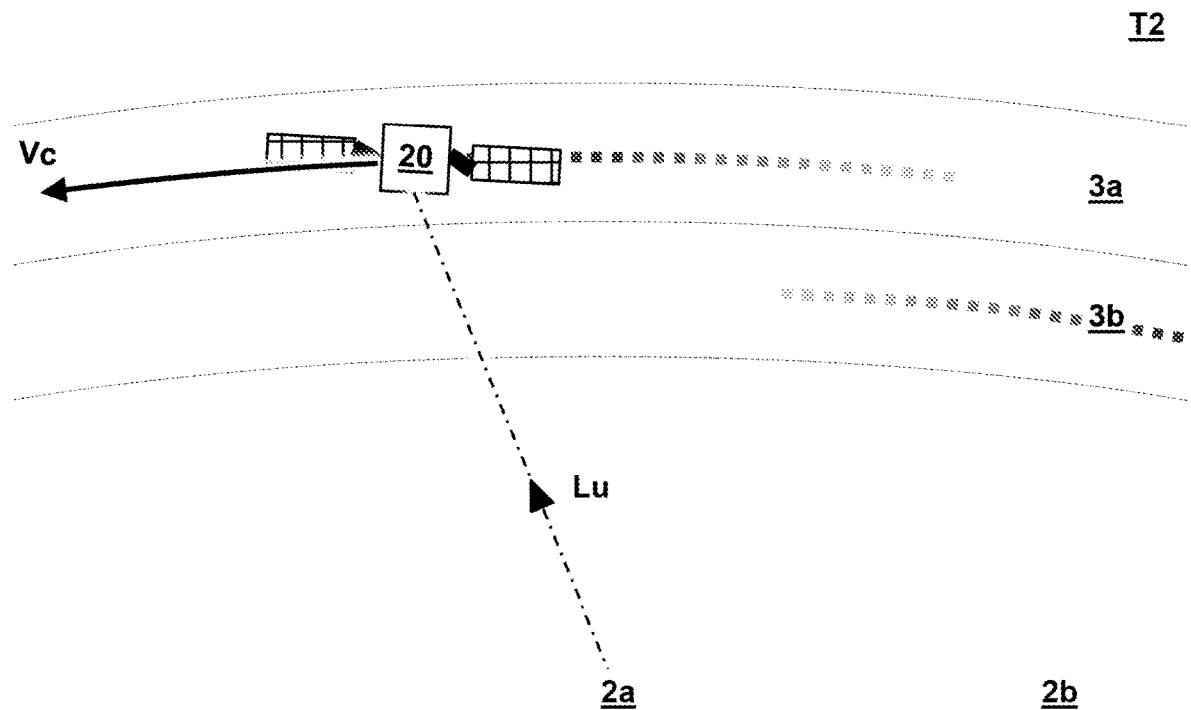

FIGS. 3A and 3B schematically illustrate two subsequent snapshots of a guidestar satellite 30 and communication satellite 20 in different orbits 3a, 3b above the earth (not shown here). In this figure, the guidestar satellite 30 is also shown to have a different velocity Vg an direction than the velocity Vc of the communication satellite 20.

The schematic snapshot of FIG. 3A illustrates the system of satellites 20,30 at a first time T1 when a reference beam Lr is transmitted by the guidestar satellite 30 to a transceiver on the ground (not shown here) through a specific part 2a of the atmosphere. In the figure, also a downlink beam Ld of the communication satellite 20 is shown at a slightly different direction (exaggerated here for illustrative purposes), and going through a different part 2b of the atmosphere than the reference beam Lr.

The schematic snapshot of FIG. 3B illustrates the system at a subsequent second time T2 when the communication satellite 20 is at a subsequent position to receive the corresponding uplink beam Lu. The subsequent position of the communication satellite 20 receiving the uplink beam Lu is the position at or near the positon where the guidestar satellite 30 (no longer visible) previously resided in FIG. 3A, or at least a position along a length of the paths of the light rays Lu, Lr so that they can substantially overlap in the same part 2a of the atmosphere.

Figure 4:
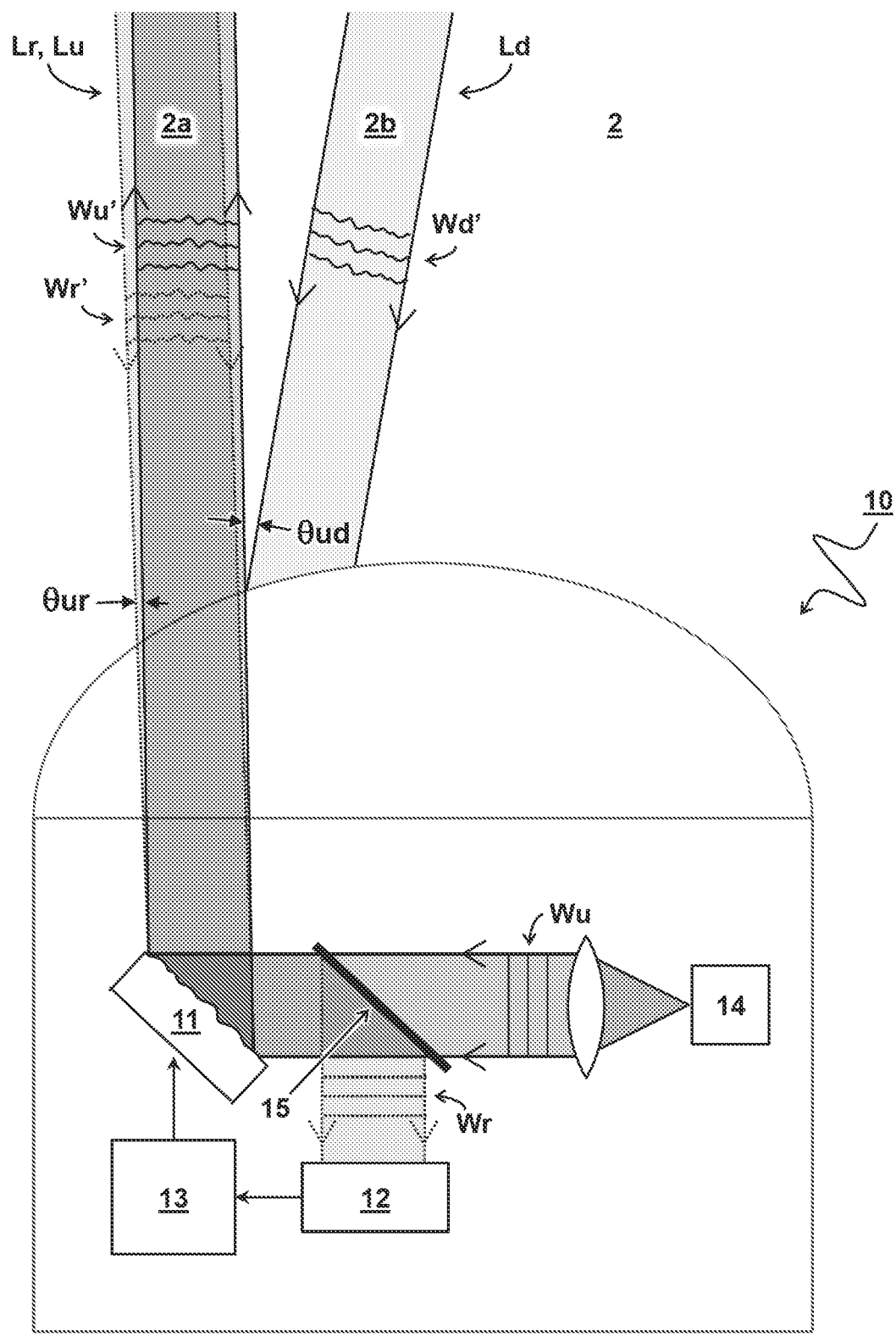
FIG. 4 schematically illustrates an embodiment of a transceiver.

FIG. 4 schematically illustrates an embodiment of a transceiver 10 for optical communication from earth with a communication satellite in an orbit above the earth. Typically, the transceiver 10 is embodied as a fixed ground station. Alternatively, the transceiver 10 may also be conceived as a mobile device.

In some embodiments, the transceiver 10 comprises a transmitter configured to transmit information encoded in an uplink beam Lu from the transceiver 10 to the communication satellite 20. For example, the transmitter comprises or couples to a light source 14 such as a laser emitting a modulated beam of light. In some embodiments, the transceiver 10 comprises a wavefront sensor 12 configured to measure a reference distortion Wr' of an initially flat wavefront Wr of a reference beam Lr. In some embodiments, the transceiver 10 comprises adaptive optics 11 configured to pre-correct a wavefront Wu of the uplink beam Lu prior to its transmission based on the measured reference distortion Wr'. Preferably, as described herein, the transceiver 10 is configured to receive specifically the reference beam Lr originating from a guidestar satellite formed by a separate object appearing at a distance in front of the communication satellite 20. For example, adaptive optics are typically known from the field of astronomy to remove image blurring aberrations induced by wavefronts propagating through earth's atmosphere. For example MEMS deformable mirrors, piezoelectric deformable mirrors, Shack-Hartmann wavefront sensors, et cetera can be used.

In one embodiment, the wavefront sensor 12 comprises a directional receiver, e.g. projection optics, configured to receive the reference beam Lr specifically from the guidestar satellite traveling in front of the communication satellite (both not visible here). In the embodiment shown, the transceiver 10 comprises a filter 15 to direct the reference beam Lr to the wavefront sensor 12. Preferably, the filter 15 comprises a mirror to reflect (or pass) the reference beam Lr to the wavefront sensor 12. For example, the filter 15 comprises a dichroic mirror configured to selectively transmit light of the uplink beam Lu while reflecting light of the reference beam Lr, or vice versa. For example, the uplink beam Lu comprises light in a first wavelength range such as near infrared while the reference beam Lr comprises light in a second wavelength range such as visible light. Of course also other ranges are possible and the ranges can even overlap. Alternatively to a dichroic mirror in principle also a semi-transparent mirror may be used. And also other means of filtering and selection of beams can be used such as (combinations of) polarizers, wave plates, anchor polarization dependent mirrors.

In some embodiments, the communication satellite (not visible here) is configured to transmit information encoded in a downlink beam Ld from the communication satellite 20 to the transceiver 10, or other transceiver (not shown). Typically, the downlink beam Ld may be directed to a receiver sensor (not shown) for decoding the information transmitted by the communication satellite 20. In a preferred embodiment, the transceiver 10 comprises a filter to prevent light of the downlink beam Ld impinging the wavefront sensor 12. For example, a spatial filter may be used since the downlink beam Ld originates from a different direction than the reference beam Lr (difference angle θud, exaggerated in the figure). Alternatively, or in addition, e.g. a wavelength filter may be used. In some embodiments, the transceiver 10 comprises a second wavefront sensor (not shown) configured to measure a wavefront Wd' of a downlink beam Ld originating from the communication satellite 20. For example, measurements of the second wavefront sensor can be additionally used to pre-correct the wavefront Wu of the uplink beam Lu, e.g. this may give a sort of depth vision to estimate layers in the atmosphere 2.

In the embodiment shown, the reference beam Lr is received from a first direction and the uplink beam Lu is transmitted in a second direction, wherein the first and second directions overlap, at least within a relatively small angular difference θur. The angle θur is at least smaller than a point ahead angle θud which would be used if the downlink beam Ld received from the same communication satellite 20 were used as the reference beam. For example, for a satellite in geostationary orbit, the point ahead angle θud can be calculated by the displacement of the satellite within the roundtrip time divided by the distance of a single trip, e.g. $\theta ud \approx \tan^{-1}(700 \text{ m}/36000 \text{ km})=0.001$ degrees plane angle or about four arc seconds. In a preferred embodiment, the directions of the reference beam Lr and uplink beam Lu are substantially in overlapping direction within an angular difference θur of less than two arc seconds, preferably less than one arc second, more preferably than half an arc second, more preferably than a fifth of an arc second, or even less than a tenth of an arc second. The less the angular difference, the better the correspondence of the respective paths through the atmosphere.

In one embodiment, the transceiver 10 has an aperture for receiving the reference beam Lr with an area of at least ten square centimeter, preferably more than hundred square centimeter, e.g. one meter diameter, or more to collect sufficient reference light. For example, a surface of $0.1 \text{ m}^2$ on the guidestar satellite 30 reflects sunlight from orbit towards onto the earth spread over an area of $10000 \text{ m}^2$. This means the power density would decrease at least by a factor $10^6$ or more, e.g. typically $10^8$ depending on absorption in the atmosphere. If the power density in orbit is about $1000 \text{ W/m}^2$, this would provide $10^{-5} \text{ W/m}^2$ on the ground. If the transceiver 10 has an aperture for receiving the reference beam Lr of about 0.1 m, this could yield a signal of about 1 μW. Of course also other values are possible depending on circumstances.

For the purpose of clarity and a concise description, features are described herein as part of the same or separate embodiments, however, it will be appreciated that the scope of the invention may include embodiments having combinations of all or some of the features described. For example, while embodiments were shown for specific arrangements of satellites, also alternative ways may be envisaged by those skilled in the art having the benefit of the present disclosure for achieving a similar function and result. Optical components, as shown, may be combined or split up into one or more alternative components to provide the same functionality. The various elements of the embodiments as discussed and shown offer certain advantages, such as improved correction of atmosphere induced wavefront distortion in uplink beams. Of course, it is to be appreciated that any one of the above embodiments or processes may be combined with one or more other embodiments or processes to provide even further improvements in finding and matching designs and advantages. It is appreciated that this disclosure offers particular advantages to satellite communication, and in general can be applied for any application wherein light beams are sent to moving objects in space.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A method of optical communication between a transceiver on earth and a communication satellite in an orbit above the earth, the method comprising:
    transmitting, by the transceiver, information encoded in an uplink beam to the communication satellite, wherein the uplink beam travels through an atmosphere there between, and wherein a wavefront of the uplink beam is distorted as a result of its propagation through the atmosphere;
    measuring, by the transceiver using a wavefront sensor, a reference distortion of a wavefront of a reference beam, wherein the reference distortion is caused by the reference beam propagating through the atmosphere;
    pre-correcting, by the transceiver using adaptive optics a wavefront of the uplink beam prior to transmitting the uplink beam, wherein the pre-correcting is based on the measured reference distortion,
    wherein the pre-correcting at least partially negates the wavefront distortion caused by the uplink beam traveling through the atmosphere and improves the wavefront of the uplink beam arriving at the communication satellite after propagating through the atmosphere,
    wherein the reference beam originates from a guidestar satellite formed by a separate man-made object which, at least at the moment of sending the reference beam used for the pre-correction, is disposed at a distance from the communication satellite, wherein the reference beam travels through the same part of the atmosphere as the uplink beam,
wherein the distance between the communication satellite and the guidestar satellite is at least equal to a velocity of the communication satellite divided by a roundtrip time that it takes the reference beam to travel from the guidestar satellite to the transceiver and the corresponding uplink beam to travel from the transceiver back to the communication satellite.

2. The method according to claim 1, wherein the guidestar satellite precedes the communication satellite in the same orbit with a fixed distance there between.

3. The method according to claim 1, wherein the communication satellite and the guidestar satellite are in geostationary orbit.

4. The method according to claim 1, wherein the guidestar satellite comprises a reflector or other light redirection means configured to redirect a beam of light as the reference beam towards the transceiver.

5. The method according to claim 1, wherein the reference beam originates from a celestial object.

6. The method according to claim 1, wherein the guidestar satellite comprises a pointing device or tracker to direct or redirect the reference beam to the transceiver.

7. The method according to claim 1, wherein the guidestar satellite comprises:
a sensor configured to receive a locator beam from the transceiver, and wherein the method includes controlling, based on the received locator beam, the pointing device to direct the reference beam; and/or
a controller keeping track of the relative position of the transceiver for directing the reference beam towards the transceiver.

8. The method according to claim 1, wherein the directions of the reference beam and uplink beam overlap within an angular difference of less than one arc second.

9. The method according to claim 1, wherein multiple different guidestar satellites provide reference beams for pre-correction of the uplink wavefront.

10. The method according to claim 1, wherein the wavefront sensor comprises a directional receiver configured to receive the reference beam from the guidestar satellite traveling in front of the communication satellite.

11. The method according to claim 1, wherein the communication satellite is configured to transmit information encoded in a downlink beam from the communication satellite to the transceiver, and
wherein the transceiver comprises a filter to prevent light of the downlink beam impinging the wavefront sensor.

12. The method according to claim 1, wherein the transceiver comprises a second wavefront sensor configured to measure a wavefront of a downlink beam originating from the communication satellite, and
wherein measurements of the second wavefront sensor are additionally used to pre-correct the wavefront of the uplink beam.

13. A transceiver for optical communication from earth with a communication satellite in an orbit above the earth, the transceiver comprising:
a transmitter configured to transmit information encoded in an uplink beam from the transceiver to the communication satellite, wherein the uplink beam travels through an atmosphere there between, wherein a wavefront of the uplink beam is distorted as a result of its propagation through the atmosphere;
a wavefront sensor configured to measure a reference distortion of a wavefront of a reference beam, wherein the reference distortion is caused by the reference beam propagating through the atmosphere;
adaptive optics configured to pre-correct a wavefront of the uplink beam prior to its transmission based on the measured reference distortion, wherein the pre-correction at least partially negates the measured wavefront distortion caused by travel through the atmosphere to improve the wavefront of the uplink beam arriving at the communication satellite after propagating through the atmosphere;
wherein the transceiver is configured to receive the reference beam originating from a guidestar satellite formed by a separate man-made object appearing, from a point of view of the transceiver in a trajectory of the communication satellite at a distance in front of the communication satellite wherein the reference beam is received from the same direction as wherein the uplink beam is sent; and
wherein the transceiver further comprises a second wavefront sensor configured to measure a wavefront of a downlink beam originating from the communication satellite, wherein measurements of the second wavefront sensor are additionally used to pre-correct the wavefront of the uplink beam.

14. A system comprising:
a transceiver configured to transmit information encoded in an uplink beam and receive a reference beam;
a communication satellite in orbit configured to receive the uplink beam from the transceiver, and
a guidestar satellite configured to send the reference beam to the transceiver, the guidestar satellite being formed by a separate man-made object in a same orbit in front of a path of the communication satellite,
wherein the communication satellite and the guidestar satellite are separated by a distance at least equal to a velocity of the communication satellite divided by a roundtrip time that it takes the reference beam to travel from the guidestar satellite to the transceiver and the corresponding uplink beam to travel from the transceiver back to the communication satellite.

15. The method according to claim 1, wherein the reference beam originates from a moon.

16. The method according to claim 1, wherein the reference beam originates from a sun.

* * * * *